(12) United States Patent
Stratis et al.

(10) Patent No.: US 8,416,127 B2
(45) Date of Patent: Apr. 9, 2013

(54) DYNAMIC CALIBRATION RADAR SYSTEM

(75) Inventors: Glafkos K. Stratis, Lake Worth, FL (US); Alphonso A. Samuel, Tucson, AZ (US); Salvatore Bellofiore, Vail, AZ (US); David J. Knapp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 194 days.

(21) Appl. No.: 13/076,816

(22) Filed: Mar. 31, 2011

(65) Prior Publication Data

US 2012/0249358 A1 Oct. 4, 2012

(51) Int. Cl.
*G01S 7/40* (2006.01)
(52) U.S. Cl. ............ 342/174; 342/188; 342/62
(58) Field of Classification Search ............ 342/174, 342/188, 62
See application file for complete search history.

(56) References Cited

U.S. PATENT DOCUMENTS

| | | | | |
|---|---|---|---|---|
| 4,570,166 A * | 2/1986 | Kuhn et al. | ............ | 343/872 |
| 5,247,843 A | 9/1993 | Bryan | | |
| 5,384,458 A * | 1/1995 | Hilliard et al. | ............ | 250/227.17 |
| 5,808,578 A * | 9/1998 | Barbella et al. | ............ | 342/62 |
| 5,973,649 A | 10/1999 | Andressen | | |
| 6,219,005 B1 | 4/2001 | Szafranek | | |
| 6,268,822 B1 * | 7/2001 | Sanders et al. | ............ | 342/54 |
| 6,407,711 B1 * | 6/2002 | Bonebright et al. | ............ | 343/705 |
| 6,531,989 B1 | 3/2003 | Barker et al. | | |
| 2003/0057320 A1 * | 3/2003 | Schneider et al. | ............ | 244/63 |
| 2006/0227039 A1 * | 10/2006 | Schroeder et al. | ............ | 342/118 |
| 2008/0174509 A1 * | 7/2008 | Williams | ............ | 343/872 |
| 2008/0297402 A1 * | 12/2008 | Wooldridge | ............ | 342/174 |
| 2009/0250634 A1 * | 10/2009 | Chicklis et al. | ............ | 250/492.1 |
| 2011/0017864 A1 * | 1/2011 | Roemerman | ............ | 244/3.16 |
| 2012/0181374 A1 * | 7/2012 | Williams | ............ | 244/3.19 |
| 2012/0249357 A1 * | 10/2012 | Stratis et al. | ............ | 342/54 |
| 2012/0249358 A1 * | 10/2012 | Stratis et al. | ............ | 342/62 |

\* cited by examiner

*Primary Examiner* — John B Sotomayor
(74) *Attorney, Agent, or Firm* — Renner, Otto, Boisselle & Sklar, LLP

(57) ABSTRACT

A missile radar system includes a tapered radome covering a front face of a main antenna. A calibration antenna is the combination of a metal tip and an attached one or more radiating or excitation elements (monopole) on the tip. A narrow end (wedge) of the radome may aid in directing planar calibration waves toward the main antenna. The metal tip has a curved inner surface that acts, with the attached radiating element(s), as an aperture antenna. Signals are emitted from the calibration antenna back toward the front face of the main antenna. The signals pass from the tip/reflector to the front face of the main antenna through a substantially-metal-free and substantially-dielectric-free volume defined by the inner surface of the radome. The radar system allows for calibration of the antenna prior to launch and/or during flight of the missile.

19 Claims, 2 Drawing Sheets

DYNAMIC CALIBRATION RADAR SYSTEM

BACKGROUND OF THE INVENTION

1. Field of the Invention

The present invention relates to calibration of a radar antenna and the associated software, and particularly to calibrating such an antenna and software in a missile in flight, or just prior to flight.

2. Description of the Related Art

Missiles that use radar as part of their guidance systems generally have a radar antenna in the nose of the missile behind a radome. The radome includes a conical cap which is made of a radar-opaque material, typically metal. The balance of the radome forward of the radar antenna and behind the cap is made of a material transparent to radar, such as a suitable ceramic material.

The radar antenna is calibrated in the course of manufacture and initial setup. Due to manufacturing repeatability it is very difficult to have exactly the same characteristics inside each radome—for example, there may be fluctuations in radome thickness and variations in antenna installations within radome. Typically calibration is done in an anechoic chamber with a source of microwave radiation of known energy.

Calibration of a radar antenna may be critical to its proper performance. This is especially true where sophisticated and sensitive software is used to interpret the received signals. For example, software used to distinguish the intended target from various decoys, jamming and/or camouflaging defensive measures associated with the target works better after calibration. Even if accurately calibrated during initial manufacture, the antenna's response to incoming signals can vary over time. For example, after storage of the missile for a long period of time, the antenna can suffer slight physical changes which alter its response. In addition, the very act of launching a missile may subject it to forces and/or temperatures which alter its response.

Because the radar antenna's response can change over time, there is a need for a system and apparatus that can be used to recalibrate a radar antenna in a missile while the missile is in flight, or shortly before flight.

SUMMARY OF THE INVENTION

According to an aspect of the invention, a polarimetric calibration antenna includes excitation of an inner surface of a tip of a missile.

According to another aspect of the invention, a polarimetric calibration antenna includes combined effects of both an inner surface of a tip of a missile, and the tip combined with a wedge of the missile that is just aft of the tip.

According to a further aspect of the invention, a dynamic polarimetric calibration of a missile antenna is performed just before or during flight of a missile.

According to a still further aspect of the invention, a dynamic polarimetric calibration of a missile antenna is performed just prior to flight of the missile.

According to another aspect of the invention, a signal path from a calibration antenna to a main antenna does not substantially interact with any metal objects within a radome.

According to still another aspect of the invention, a signal path from a calibration antenna to a main antenna does not substantially interact with any metal or dielectric objects between the two antennas.

According to yet another aspect of the invention, a missile radar system includes: a main radar antenna; a tapered radome covering a front face of the main antenna; a metal tip at a narrow end of the radome; and excitation elements on an inner surface of the metal tip. The metal tip functions as a reflector, reflecting signals emitted by the excitation elements toward the main antenna. A volume bordered by the tip, the excitation elements, the main antenna, and an inner surface of the radome, is substantially free of metal objects.

According to still another aspect of the invention, a missile radar system includes: a main radar antenna; a tapered radome covering a front face of the main antenna; and a calibration antenna. The calibration antenna includes: a metal tip at a narrow end of the radome; and excitation elements on an inner surface the metal tip.

According to a further aspect of the invention, a method of calibrating a main antenna of a missile radar system of a missile includes: emitting a signal from a calibration antenna that includes a tip of the missile; passing the signal from the calibration antenna to the main antenna, wherein the signal does not interact with any metal objects in a volume bordered by the calibration antenna, the main antenna, and an inner surface of a radome of the missile; and receiving the signal at the main antenna.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A missile radar system includes a tapered radome covering a front face of a main antenna. A calibration antenna is the combination of a metal tip and an attached one or more radiating or excitation elements (monopole) on the tip. A narrow end (wedge) of the radome may aid in directing planar calibration waves toward the main antenna. The metal tip has a curved inner surface, with the attached radiating element(s), that acts as an aperture antenna. Signals are emitted from the calibration antenna back toward the front face of the main antenna. The signals pass from the tip/reflector to the front face of the main antenna through a substantially-metal-free and substantially-dielectric-free volume defined by the inner surface of the radome. With the aperture radiating structure, the signals are substantially plane waves emitted by the calibration antenna, which plane waves are received at the face of the main antenna, without the use of any intervening lenses. The radar system allows for calibration of the antenna prior to launch and/or during flight of the missile. The calibration antenna may include a pair of polarized antenna elements on the inside surface of the metal tip, which converts the tip to a polarimetric aperture antenna.

Figure 1:
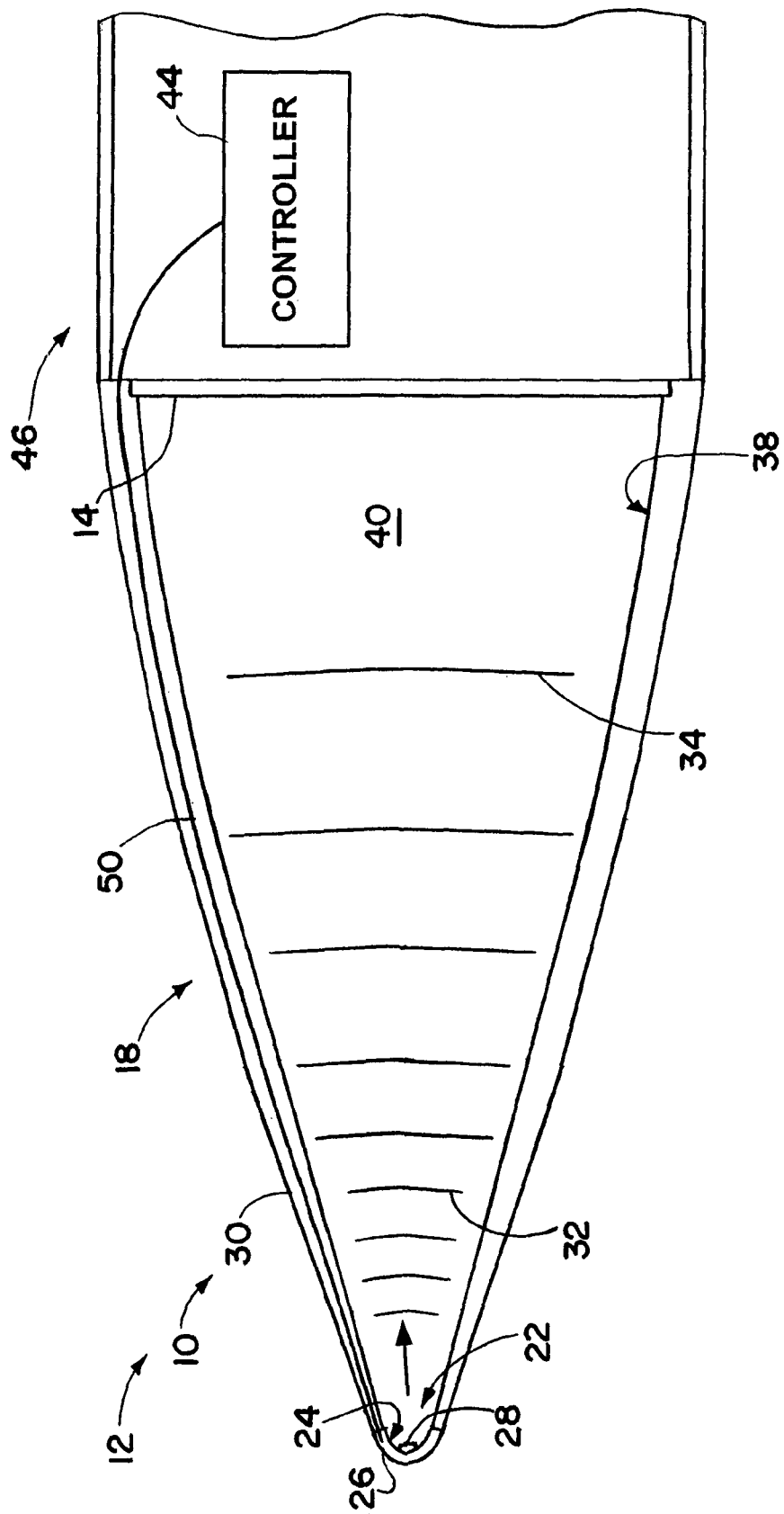
FIG. 1 is a cross-sectional view of a missile having a missile radar system in accordance with an embodiment of the present invention.

FIG. 1 shows a missile radar system 10 of a missile 12. The missile system 10 includes a main antenna 14 that sends and receives signals through a radome 18 that is at the front of the missile 12, forward of the main antenna 14. The main antenna 14 may be in any suitable configuration, for example including a circular array of waveguides that could be represented as a plurality of slits. The main antenna 14 may be divided (either physically or logically) into four quadrants that meet at the center of the array. The signals from each waveguide within each quadrant are combined, and the so-combined signal from each quadrant forms a channel of a multichannel antenna. (Other numbers of channels, each formed by a sector of the antenna may also be used.) Suitable software (not shown) may be used for processing signals from the main antenna 14, and/or for controlling operation of the main antenna 14, using a suitable device, such as a suitable processor. It will be appreciated that other configurations of the main antenna 14 are possible.

The radome 18 may be made of a variety of suitable materials, for example suitable ceramics. The radome 18 may have any of a variety of suitable tapered shapes, being narrow at the front of the missile 12, and wider at the aft end of the radome 18, where the main antenna 14 is located. The radome 18 may have a conical or ogive shape, for instance.

For various reasons including the passage of time and associated aging of electronic components, as well as exposure to heat and shock or vibration, the main antenna 14 may need to be recalibrated in flight, or just prior to flight. For example changes in material properties of the radome 18 may occur due to changes in temperature that occur during flight of the missile 12. Changes in temperature may change the dielectric properties of the radome material, changing reflection/transmission coefficients of various parts of the radome 18. Calibration of the main antenna 14 in flight may allow compensation for the changes in radome material properties.

Calibration before or during flight may also be desirable in order to change polarization of the signal from the main antenna 14, for instance in order to better locate a target. Thus it may be desirable to have polarimetric calibration, in addition to the usual non-polarimetric calibration. Dynamic polarimetric calibration may improve the radar cross-section (RCS) of a target dynamically, and/or may improve other target characteristics, making targets easier to find and/or track.

Polarization capabilities include taking advantage for angle of arrival calculations, by using the so called vector sensor techniques. Polarimetric capabilities introduce polarimetric signal processing for dynamic interference rejection. This is advantageous because in certain scenarios, beamforming (a signal processing technique used in sensor arrays for directional signal transmission or reception) by itself is not enough for interference avoidance.

In addition it will be appreciated that the channels of the main antenna 14 are highly sensitive under various conditions, such as thermal variations, and that the channels can become phase incoherent unless properly calibrated. Providing calibration or polarimetric calibration is advantageous at all applicable frequencies. Frequencies are "applicable frequencies" if their wavelengths are smaller than or equal to the diameter of the aperture. The diameter of the aperture is the diameter of the metallic tip plus a region within the dielectric wedge (described below) that acts as a waveguide. Such wave guiding effects can be observed in FIG. 3 (discussed below), with a flattening out of the wavefronts.

Calibration/polarimetric calibration of the main antenna 14 may be accomplished using electromagnetic (EM) radiation of a known transmitted polarization from a calibration antenna 22 that is the inner surface 24 of a metal tip 26 that is located at a front of the radome 18, combined with excitation elements 28 located on the inner surface 24. A wedge 30 of the radome 18 is just aft of the metal tip 26. The wedge 30 is a tapered region of the radome 18, having a diameter that increases from a minimum value where the wedge 30 joins the tip 26. The wedge 30 aids the metal tip inner surface 24 and the excitation elements 28 in functioning as an aperture antenna. The calibration antenna 22 may emit calibration signals that have the characteristics of being almost plane waves near the calibration antenna 22, shown at 32 in FIG. 1. The waves are not exactly planar, since perfect plane waves are an ideal configuration that is not achieved in nature. Curvature in the waves emitted by the calibration antenna 22 is reduced as the waves flatten out during their movement aft through the radome 18, as described further below.

The polarimetric calibration procedure takes into account the depolarizing effects introduced by the radome 18 at various angles of incidence. More specifically the depolarizing effects introduced by the radome 18 at various angles of incidence are saved in a database. The depolarization due to the radome 18 and the angle of incidence is subtracted or corrected based on the calibration to resemble the response the main antenna 14 would have in free space.

As the calibration signals approach the main antenna 14 they further flatten out, as shown at 34 in FIG. 1, becoming substantially planar waves by the time that they reach the main antenna 14. The further the waves move from the calibration antenna 22, the more they flatten out. This flattening out of the calibration signal wave fronts occurs in different ways at different frequencies. At higher frequencies the flattening occurs at a smaller distance compared to lower frequencies. At lower frequencies the dimensions of the radome 18 will tend to be bigger than at higher frequencies. For instance a dish antenna at lower frequencies may be bigger in size that another dish antenna of higher frequencies. In general the operating wavelength will be equal to or smaller than the aperture of the metallic tip. However there are untraditional radiating apertures with metamaterial attachments that become radiating structures even though they are physically smaller than the wavelength. The shape or curvature of the metallic tip inner surface 24, the excitation elements (which may be dual polarized or single polarized) 28, and the edge of radome 18 combine to form an aperture antenna structure that produces substantially planar wavefronts in the calibration signal that reaches the main antenna 14. This structure generating plane waves (substantially plane waves) does not need any other hardware, such as lenses, to shape the calibration signal.

An inner surface 38 of the radome 18 encloses and defines a volume 40 between the tip 26, combined with the exciters 28, and the dielectric wedge 30 (collectively the polarimetric calibration aperture antenna (source of plane waves) 22), on a forward end, and the main antenna 14 on an aft end. The volume 40 is essentially metal-free and dielectric-free, being substantially free of metal and dielectric solid objects that might negatively impact calibration signals travelling between the calibration antenna 22 and the main antenna 14. For example, the volume 40 does not include any sort of metal screen or metal lens-mounting hardware, such as is disclosed in U.S. Pat. No. 6,531,989, the specification of which is incorporated herein by reference.

The calibration antenna 22 is coupled to a controller/oscillator 44 in a fuselage 46 of the missile 12 via a cable 50. The calibration antenna 22 is coupled to a controller 44, such as a polarimetric processor, that is in an area 46 behind the main antenna 14 of the missile 12. The coupling may be made through a cable 50. The cable 50 may be a coaxial cable embedded in the radome 18 and/or located on the inner surface 38 of the radome 18. Signal processing software may be used to compensate for any shadows created by metal wires of the coaxial cable.

As an alternative to use of a metal wire, the cable 50 may be a fiber optic cable located within the radome 18 or on the radome inner surface 38. In addition, another alternative is to dispense with use of the cable 50 altogether, for example by using a miniature battery operated electro-optic device located (for example) on the side of the dielectric wedge 28.

Figure 2:
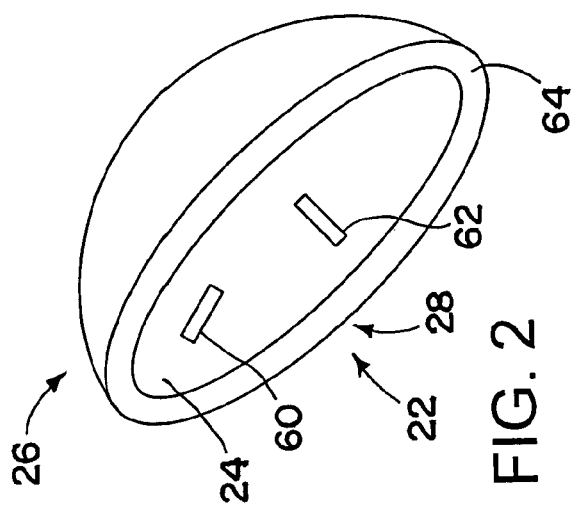
FIG. 2 is an oblique view of a tip, part of a calibration antenna of the missile radar system of FIG. 1.

Turning now to FIG. 2, the excitation elements 28 of the calibration antenna 22 include two radiating (excitation) elements 60 and 62, which may be substantially perpendicular to one another. Alternatively the excitation elements 60 and 62 may be at another angle to one another, for instance a 45-degree angle. The excitation elements 60 and 62 are dual polarized radiating elements that allow sending of a polarized calibrating signal, to accomplish a polarimetric calibration of the main antenna 14 (FIG. 1). The phases and amplitudes of the excitation elements 60 and 62 are controlled by the controller 44 (FIG. 1).

The excitation elements 60 and 62 are located on the metal tip inner surface 24. The excitation elements 60 and 62 are shown in the illustrated embodiment as separated, but alternatively they may be co-located. The excitation elements 60 and 62 are secured to the metal tip inner surface, such as by soldering. More broadly, the excitation elements 60 and 62 may be within the curved inner surface 24 (within a volume bounded by the tip inner surface 24 and a plane passing through an edge or lip 64 of the metal tip 26). The tip inner surface 24 has a concave shape that directs the calibration signals toward the main antenna 14. The shape may be an axisymmetric shape, substantially axisymmetric about a longitudinal axis of the tip 26 and/or the missile 12 (FIG. 1). The tip inner surface 24 may be a parabolic shape surface, a spherical shape surface, a cone, or pyramid.

The excitation elements (radiation elements) 60 and 62 on the metallic tip 20 may be cross-polarized exciters that allow for polarization calibration of the main antenna 14. Polarization calibration, in its simplest form, includes control of phases and magnitudes between at least two channels corresponding to the elements 60 and 62. The corresponding phases and magnitudes are combined in such a way that they produce certain polarization states. For instance, if two radiating elements are excited with their corresponding signals of equal amplitude 90 degrees phase between them, that produces a circular polarization. If the phase difference between the radiating elements, leads (e.g., at +90 degrees) or lags behind (e.g., at −90 degrees), with respect to each other then what is produced is left hand circular polarization or right hand circular polarization, respectively. The two important parameters for having good control of the polarization are the magnitudes and phases between the radiating elements 60 and 62. Issues such as higher temperatures in circuits of the controller 46, bad connections, bad circuit/phase synchronization, or any circuit malfunction may lead to polarimetric malfunctions, and thus to erroneous polarimetric results.

A further extension of polarimetric calibration is to generate the polarimetric matrices. In this various targets of known polarimetric matrices are chosen for polarimetric calibrations. Examples are a dihedral, a sphere, or other known targets have known polarimetric matrices. In a polarimetric calibration procedure such known targets are illuminated with radio frequency (RF) energy at different incident polarizations. The reflected signals from such known polarimetric targets should match well with the known polarimetric matrix or scattering matrix of the target. In its simplest form this matrix could be a 2×2 mathematical matrix. If that backscattered matrix matches the previously known matrix for the known target, then the system is polarimetrically tuned or calibrated. If the scattering matrix (reflection matrix) does not match the known matrix, then the appropriate calibrations may be performed. The calibrations may include, phase and or voltage magnitude calibrations so that the previously-known matrix is matched or closely approximated.

For the system 10 there are electromagnetic (EM) waves that pass through the radome 18. In a database, which may be part of the controller 46 or accessible by the controller 46, there may be saved known polarimetric matrices for certain targets at free space conditions. In the presence of radome 18 (which is not a free space condition), the incoming reflected waves will be depolarized through the radome 18. The depolarization due to the radome 18 can be compensated for by the controller 46 of the system 10, for example by adjusting the phases and amplitudes of voltages for the excitation elements 60 and 62. If the temperature of the radome 18 changes after a certain flight period, the dielectric properties of the radome 18 may change, which would cause changes in the effects of the radome 18 on polarization, relative to the effect on polarization of the radome 18 at its original temperature. A recalibration at the new radome temperature may provide new adjustments to take into account the new depolarization effect. This is one example of the advantages of a dynamic polarimetric calibration, such as can be performed with the system 10.

Figure 4:
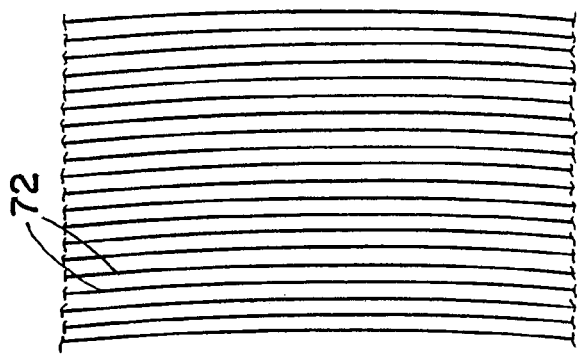
FIG. 4 is an illustration of the wavefronts of FIG. 3 as they advance toward the main antenna.
Figure 3:
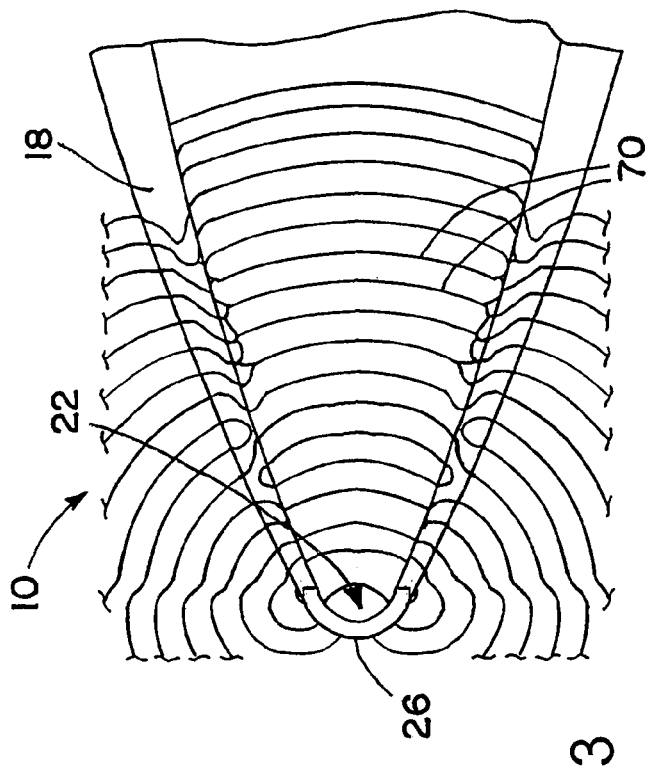
FIG. 3 is an illustration of wavefronts produced in the vicinity of the tip of the missile radar system of FIG. 1.

FIGS. 3 and 4 show an example of the wavefronts that may be produced by an embodiment of the radar system 10. FIG. 3 shows wavefronts 70 near the calibration antenna 22, showing some interaction between the wavefronts 70 and the material of the radome 18. FIG. 4 shows (in the same scale as FIG. 3) wavefronts 72 at a location after the wavefronts have traveled about 60% of the distance between the calibration antenna 22 and the main antenna 14 (FIG. 1). The wavefronts 72 are substantially planar, being much flatter than the wavefronts 70 shown in FIG. 3.

The radar system 10 advantageously allows a calibration of the main antenna 14 without use of lenses. The calibration may be performed substantially without any metal objects, such as lens holders for a lens (or a metal screen), between the calibration antenna 22 and the main antenna 14. This avoids the problems in calibration that can occur due to presence of metal lens holders, such as may occur in systems such as those described in U.S. Pat. No. 6,531,989. The radar system 10 also avoids reflections from calibration antennas, by placing the calibration antenna 22 on the tip inner surface 24 (or within the tip 26).

The radar system 10 advantageously allows calibration to be performed within the missile 12, such as during flight of the missile 12. Further, the radar system 10 allows a polarization calibration to be performed on the main antenna 14, with the separate multiple antenna elements 60 and 62 enabling the polarization calibration to be performed.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A missile radar system comprising:
   a main radar antenna;
   a tapered radome covering a front face of the main antenna;
   a metal tip at a narrow end of the radome; and
   excitation elements on an inner surface of the metal tip;
   wherein the metal tip functions as a reflector, reflecting signals emitted by the excitation elements toward the main antenna; and
   wherein a volume bordered by the tip, the excitation elements, the main antenna, and an inner surface of the radome, is substantially free of metal objects.

2. The system of claim 1, wherein the volume is also substantially free of dielectric solid objects.

3. The system of claim 1, wherein the excitation elements include a pair of polarized radiating elements.

4. The system of claim 3, wherein the radiating elements are angled relative to one another.

5. The system of claim 3, wherein the radiating elements are substantially perpendicular to one another.

6. The system of claim 1, wherein the inside surface is a concave curved inside surface.

7. The system of claim 6, wherein the metal tip and the excitation elements together function as an aperture antenna.

8. The system of claim 1, further comprising a cable connecting the calibration to a controller.

9. The system of claim 8, wherein the controller is aft of the main antenna.

10. The system of claim 8, wherein the cable is a fiber optic cable.

11. The system of claim 8, wherein the cable is embedded in the radome.

12. The system of claim 8, wherein the cable runs along the inner surface of the radome.

13. A missile radar system comprising:
    a main radar antenna;
    a tapered radome covering a front face of the main antenna; and
    a calibration antenna, wherein the calibration antenna includes:
      a metal tip at a narrow end of the radome; and
      excitation elements on an inner surface the metal tip.

14. The system of claim 13, wherein the excitation elements include a pair of polarized radiating elements.

15. The system of claim 13, wherein the inner surface is a concave surface.

16. A method of calibrating a main antenna of a missile radar system of a missile, the method comprising:
    emitting a signal from a calibration antenna that includes a tip of the missile;
    passing the signal from the calibration antenna to the main antenna, wherein the signal does not interact with any metal objects in a volume bordered by the calibration antenna, the main antenna, and an inner surface of a radome of the missile; and
    receiving the signal at the main antenna.

17. The method of claim 16,
    wherein the calibration antenna include excitation elements on an inner concave surface of the tip; and
    wherein the signal is reflected off of the inner surface, toward the main antenna.

18. The method of claim 16, wherein the excitation elements includes a pair of polarized radiating elements.

19. The method of claim 16, wherein the emitting, the passing, and the receiving, all occur while the missile is in flight.

* * * * *